INVENTORS
Carlo Barassi
& Giulio Cappa

BY Stevens, Davis, Miller & Mosher

ATTORNEYS

United States Patent Office 3,344,006
Patented Sept. 26, 1967

3,344,006
METHOD FOR MANUFACTURING THE REINFORCEMENTS OF THE TREAD RINGS IN REMOVABLE TREAD TIRES
Carlo Barassi and Giulio Cappa, Milan, Italy, assignors to Pirelli S.p.A., Milan, Italy
Filed Feb. 26, 1964, Ser. No. 347,591
Claims priority, application Italy, Mar. 1, 1963, 4,363/63
2 Claims. (Cl. 156—117)

ABSTRACT OF THE DISCLOSURE

A method for constructing a reinforcing structure for tread rings of removable tread tires, including helically winding a core with the coils disposed parallel in a longitudinal direction to form an even number of superposed layers. The winding is such that, by starting from a point remote from the tread edges, a first layer of parallel coils is initially laid side by side so as to reach one of the edges, after which another layer is laid from the first recited edge to a second edge, followed by the laying of another layer from the second edge to the starting point.

---

The present invention relates to pneumatic tires in which the tread is separate from the carcass, and more precisely to pneumatic tires in which the separate tread ring is provided with a longitudinally inextensible reinforcing structure.

Heretofore, it was proposed to build up the reinforcement of the separate tread by means of helically winding a cord, the coils of such winding being disposed in a longitudinal direction. While such a reinforcement proved to be generally satisfactory, this arrangement resulted in the free ends of the cords being disposed in close proximity of the lateral edges of the reinforcing structure.

It is known to those skilled in the art that the peripheral portions of the reinforcement, and therefore of the tread, are the most delicate, since, during the molding of the tread ring, strong movements of the compound flowing out from the mold in the form of flush take place in said portions. Such movements may disarrange the position of the reinforcement coils. Consequently, the free ends of a cord are particularly liable to be displaced by the flowing compound.

The present invention aims at providing a method of constructing a reinforcing structure in which the ends of the cord will be disposed remote from the reinforcement edges.

One object of the invention is a method for the construction of a reinforcing structure for tread rings, which consists in helically winding a cord with the coils disposed in a longitudinal direction and parallel to each other, said parallel coils constituting an even number of superposed layers. This method is characterized in that, by starting from a point far from the tread edges, a first layer of parallel coils disposed side-by-side, is laid so as to reach one of the edges. Then a second layer is laid from the first mentioned edge to a second edge. Finally, a further layer is laid from the second edge to the starting point. As a result, the free ends of a cord are disposed remote from the peripheral portions.

Another object of the present invention is the reinforcement obtained according to the above described method.

The process according to the invention is also applicable to the tread rings which are provided with longitudinal grooves on their inner surface and have therefore a reinforcing structure constituted by a plurality of narrow reinforcements disposed in the portions remote from the longitudinal grooves.

Figure 1:
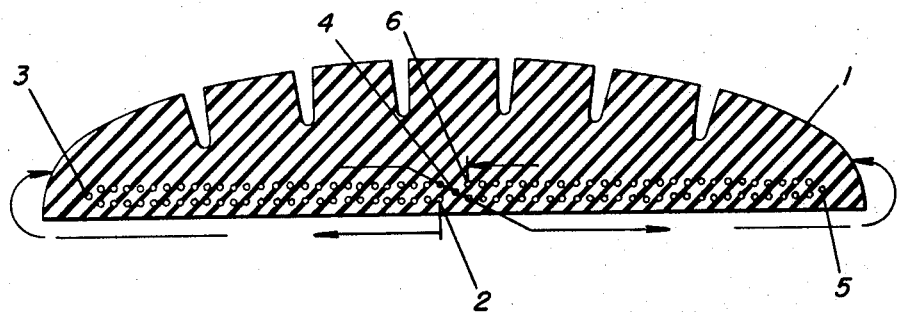
Figure 2:
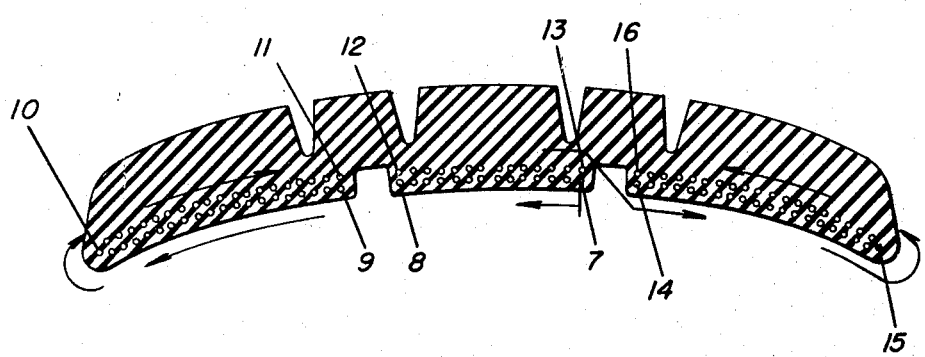

The invention will now be better illustrated with reference to the attached drawings, in which, by way of example:

FIG. 1 shows a form of tread ring that can be obtained by the method of the invention in which the reinforcing structure of the tread ring is constituted by a single reinforcement; and FIG. 2 shows another form of tread ring that can be obtained by the method of the present invention in which the reinforcing structure of the tread ring is constituted by a plurality of narrow reinforcements.

In FIG. 1, the tread ring is provided with a single reinforcement made up by helically winding one cord. The winding starts from point 2 and continues as far as the edge 3, to form a part of the inner layer. Then the laying sense is inverted and the winding, through the point 4, extends as far as the edge 5 to form a part of the second layer and the remaining part of the first. Finally, the laying sense is again inverted, and the winding continues as far as point 6, which corresponds to the starting point, to form the remaining part of the second layer.

FIG. 2 illustrates the alternative embodiment in which the tread is provided with three separate narrow reinforcements lying on a surface having a transversal bending. The process initiates at point 7 and terminates at point 16 and is quite similar to that described with reference to FIG. 1, the only difference being that, as the three strips are independent of one another, the cord is to be cut at points 8, 11 and 13 and the winding operation is respectively started at the adjacent points 9, 12 and 14.

It is understood that the above disclosed examples are not of a limiting character, and that the present invention includes all the alternative embodiments deriving from the above indicated inventive principle. For instance, it is evident that there may be more than two layers with the same technical effect being obtained, provided that their number is even.

What is claimed is:

1. A method for constructing a reinforcing structure for tread rings, consisting in helically winding a cord with the coils disposed parallel in a longitudinal direction, said parallel coils constituting an even number of superposed layers, and characterized in that, by starting from a point remote from the tread edges, a first layer of parallel coils, disposed side-by-side, is laid so as to reach one of the edges, then another layer is laid from the first recited edge to a second edge, and finally a further layer is laid from the second edge to the starting point.

2. A method as in claim 1, characterized in that the cord is cut at one or more points and the winding operation is commenced at points adjacent to the points of interruption in order to build up a reinforcing structure constituted by a plurality of narrow reinforcements.

References Cited

UNITED STATES PATENTS 2,884,044  4/1959  Hulswit et al. _____ 156—128
2,982,328  5/1961  Emanueli et al. _____ 152—361

EARL M. BERGERT, *Primary Examiner.*

J. P. MELOCHE, *Assistant Examiner.*